Aug. 16, 1949.   J. V. DAVIS   2,479,322
APPARATUS FOR CONVEYING AND IMMERSING ARTICLES
Filed Nov. 24, 1944   8 Sheets-Sheet 8

INVENTOR.
JOHN V. DAVIS.
BY Samuel Weisman
Attorney

Patented Aug. 16, 1949

2,479,322

UNITED STATES PATENT OFFICE 2,479,322

APPARATUS FOR CONVEYING AND IMMERSING ARTICLES

John V. Davis, Detroit, Mich., assignor to Udylite Corporation, Detroit, Mich., a corporation of Delaware Application November 24, 1944, Serial No. 564,978

13 Claims. (Cl. 134—70)

The present invention relates to a novel apparatus for and method of processing material in a succession of baths or fluid compartments, for example, as in electro-plating.

In such an apparatus the work is moved along the series of baths by a propelling device such as a work drive chain and must be lifted in order to cross the partition between consecutive baths. The lifting mechanism may take several forms already known in the art and is a relatively complicated device in any of these forms.

One of the objects of this invention is to simplify the lifting mechanism. Another object is to provide novel intervals and relations in the operating cycle, as a method of processing.

The novel lifting mechanism, in its broad concept, includes an elevator structure carrying a pusher device and also a section or sections of work carrier rail. When the elevator structure is raised, carrying with it the pusher device and a rail section, the pusher device remains in functioning relation to said section but moves out of functioning relation to the remaining, unmoved part of the carrier rail. In the elevated position, the pusher is given a movement that carries the work on the elevated rail section from one bath to the next. The elevator structure is lowered to re-aline the rail sections and return the pusher device to functioning relation with the entire carrier rail, and the pusher is given a movement before being elevated again for the next transfer. Automatic mechanism is provided for the timed movements of the pusher device and elevator structure.

Numerous advantages are derived from this lifting mechanism and mode of operation and are described in detail hereinafter. The particular means for realizing the individual advantages are regarded as additional objects of the invention. Among the advantages are the following: (1) The lifting mechanism is relatively simple in construction, (2) a separate transfer mechanism for each station is not required, (3) additional transfer stations may be provided by removing sections from the fixed rail and mounting them on the elevator structure, (4) the work carrier center distance may be changed without alteration of the transfer mechanism.

A novel and desirable relation in the cycle may be introduced by giving the pusher a slightly shorter movement in the elevated position than in the lower position. Thus, when the pusher elements return to the fixed rail, they lie a definite short distance behind the work carriers on that rail, and there is no possibility of misalinement between the pusher elements and the work carriers for the next push movement.

Another object of the invention is to combine such an apparatus with a separate, one-compartment tank and to propel the work in the latter tank by the vertically displaceable pusher device. This pusher device is arranged to clutch with and drive the work drive of the auxiliary tank when the pusher device is in the lowered position and to disengage the work drive when elevated.

Other characteristics and objects of the invention will appear as the description proceeds. The invention is fully disclosed by way of example in the following description and in the accompanying drawings in which

Figure 6A is a section on the line 6A—6A of Figure 6;

Figure 8 is a detail plan view of the rail joint;

Reference to these views will now be made by use of like characters which are employed to designate corresponding parts throughout.

The tank is assembled in any suitable manner and may be erected, for example, on a base consisting of longitudinal I-beams 1, transverse I-beams 2 and intermediate longitudinal beams 3 and transverse beams 4 positioned where required as will presently appear. The tank forms a closed circuit and consists of outer plates 5 mounted on the outer beams 1 and 2, inner plates 6 mounted on the inner longitudinals 3 and the end transversals 4, and partitions 7, mounted on the inner transversals 4 according to the desired length of the compartments 8 thereby formed. If desired or feasible, each compartment may be built as a separate unit and the several units assembled to form a closed processing circuit.

A number of columns 10 are mounted in the center line of the tank and extend a considerable distance above the top of the tank for a purpose that will presentlty be shown. The upper ends of the column are joined by a girder 11 for reinforcement. To opposite sides of some or all of the columns are attached angle irons 12 running lengthwise of the tank and supporting angle cross brackets 13 slightly above the tank. To the brackets are secured angle cross bars 14 for supporting electrode rail sections approximately in the center line of the tank circuit.

The rail sections 15 are laid upon the bars 14 and secured thereto by studs 16 entered from beneath the horizontal webs of the bars. A shield or pan 17 may be positioned beneath and along the rail sections and spaced therefrom by suitable insulators 18. Insulating bushings 19 surround the studs 16 within the bars 14, and an insulating washer 20 is inserted between the head 21 of each stud and the adjacent bar 14.

It is to be noted particularly that fixed rail sections 15 are spaced apart or formed with gaps 22, thereby constituting a discontinuous or interrupted rail. The ends of each rail section are formed with V-grooves 23 or other means enabling insertion of other rail sections to complete a continuous electrode rail, as will presently be shown.

The longitudinal upper edges of the tank carry angle irons 25 to which are secured hooked brackets 26 extending over the tank for supporting two independently continuous rails 27 at opposite sides of the rail sections 15. The sections 15 carry current of a given sign, and the rails 27 carry current of the opposite sign, as well known in the art.

In the upper end of each column 10, beneath the adjacent girder 11, is mounted a pulley or sprocket wheel 30 on a horizontal axis. In an adjacent angle between each column and girder are secured gusset plates 31 to support a companion pulley or sprocket wheel 32. Over each pair of pulleys 30, 32 is laid a cable or sprocket chain 33 with one lap lying within the corresponding hollow column 10. To the free end of the lap is secured a weight 34 concealed within the column. The remaining laps of the members 33 lie outside of the columns and are fastened to a suspended, vertically movable framework that is counterbalanced by the weights 34.

The suspended framework, or chassis, includes a pair of longitudinal members 35 spaced laterally a short distance from the columns 10 and running nearly the entire length of the tank. The members 35 are joined by an adequate number of transversals 36 and are reinforced by trusswork 37 thereon. The members 33 are attached to the chassis at points 38. The purpose of the chassis is to carry rail sections to fill the gaps 22, the work drive chain for work suspended on the intermediate rail, and also preferably the drive mechanism for the chain.

The center columns 10 are spaced narrowly, and between them a hydraulic cylinder 40 is suspended from the girders 11. Within the cylinder is a piston 41 from which a rod 42 extends through the lower end of the cylinder. To the rod is attached a crosshead 43 travelling in guide rails 44 fastened to the lower portion of the center columns 10. The girders 11 carry pulleys or sprockets 45 at opposite sides of the cylinder 40. The outer ends of the girders carry companion pulleys or sprockets 46 which, as well as the members 45, are on horizontal axes. On each pair of pulleys 45, 46 is laid a cable or sprocket chain 47, one end of which is attached to the crosshead 43 and the other end to the chassis 35—37 at points 48.

It is now evident that the downward stroke of the piston rod 42 and crosshead 43 elevates the chassis 35—37 and parts carried thereby, counterbalanced by the weights 34. To guide the chassis laterally and transversely while travelling vertically, roller frames 49 are carried thereby at the outer faces of the outer columns 10 and provided with vertical rollers 50 riding on the longitudinal faces of the columns.

Figures 2, 3, 4:
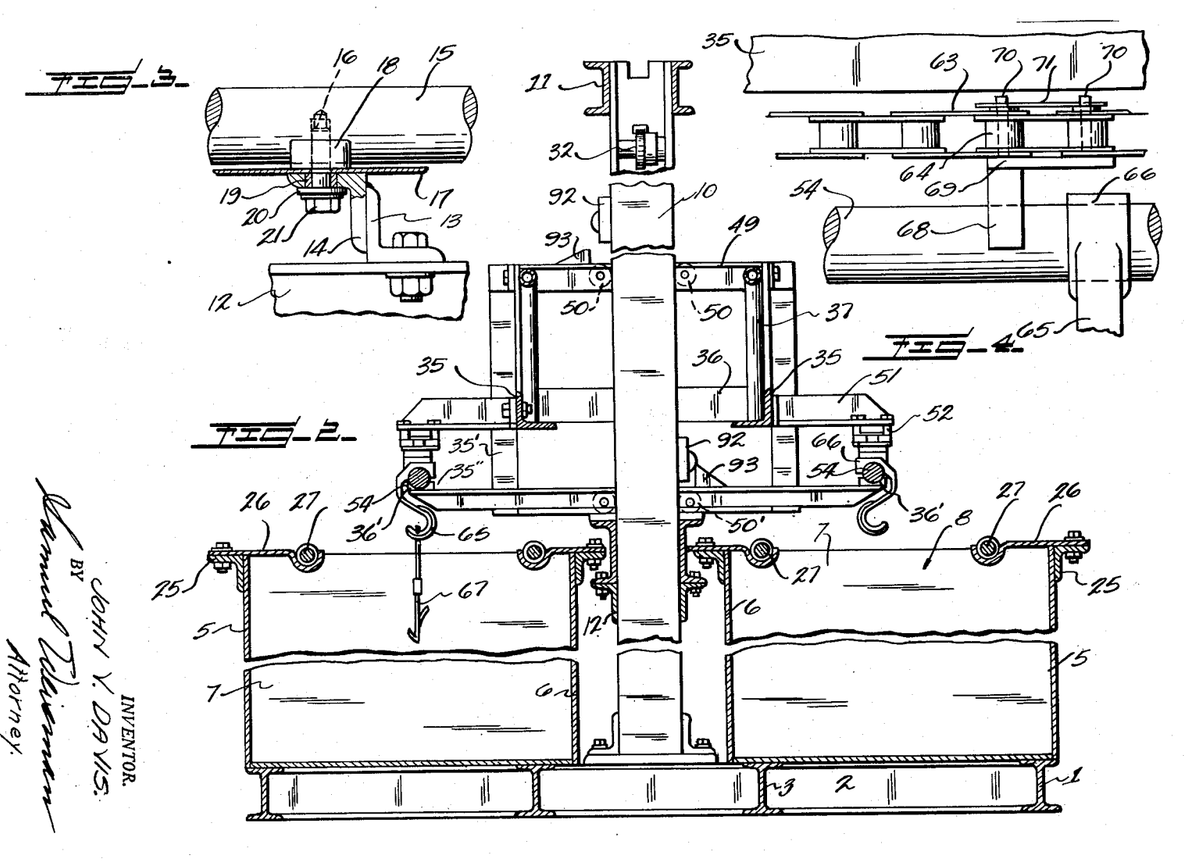
Figure 2 is a section on the line 2—2 of Fig. 1.
Figure 3 is a detail side elevation, partly in section.
Figure 4 is a detail plan view.
Figure 5:
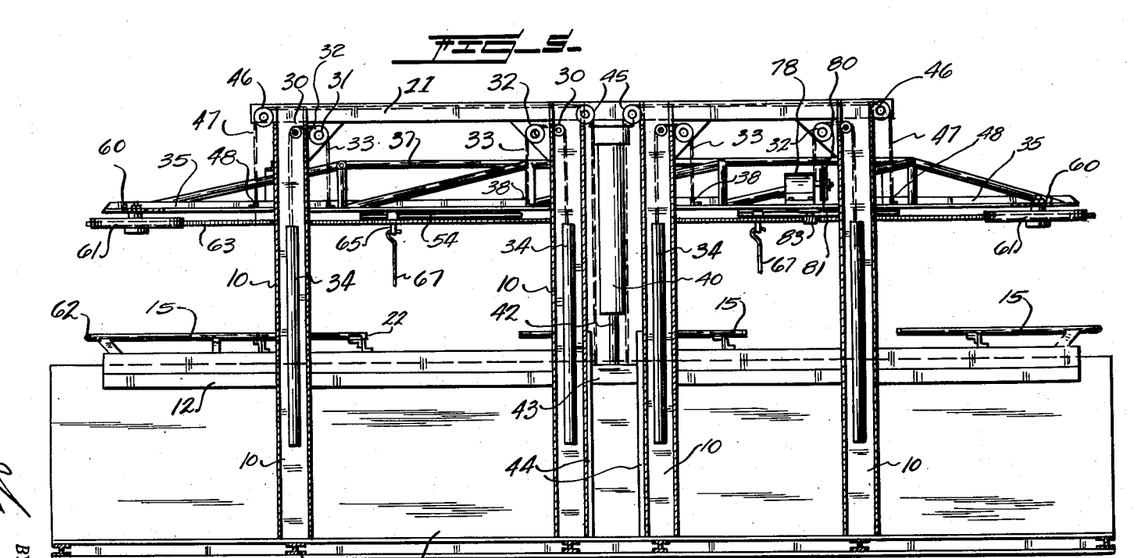
Figure 5 is a side elevation, partly in section, showing the chassis in elevated position.
Figure 6:
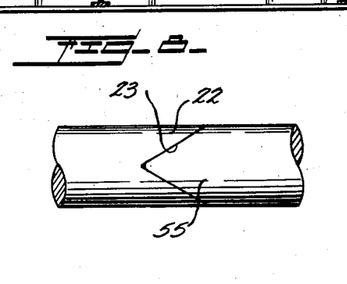
Figure 6 is a detail side elevation showing the chassis and associated parts elevated slightly from a fixed rail section.
Figures 7, 8A, 9:
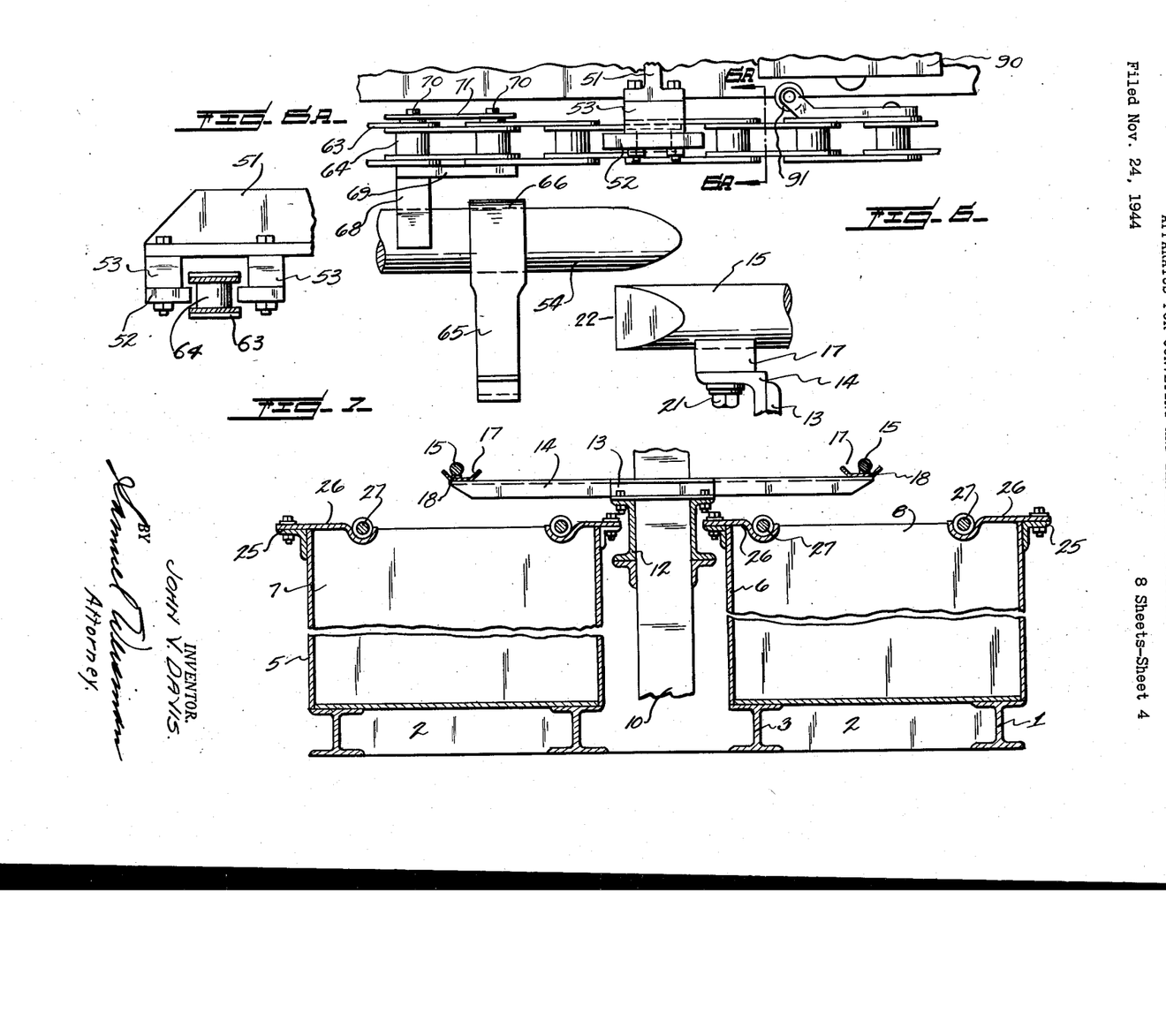
Figure 7 is a section on the line 7—7 of Figure 1.
Figure 9 is a diagram of the segmented rail.
Figure 9:
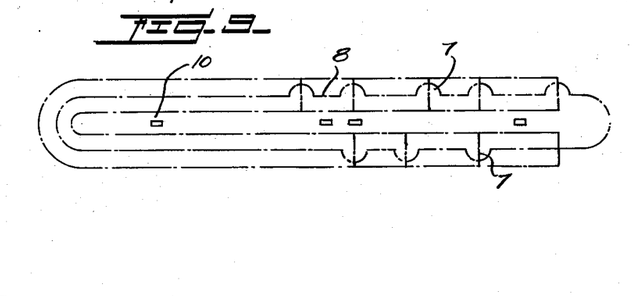
Figures 10, 11:
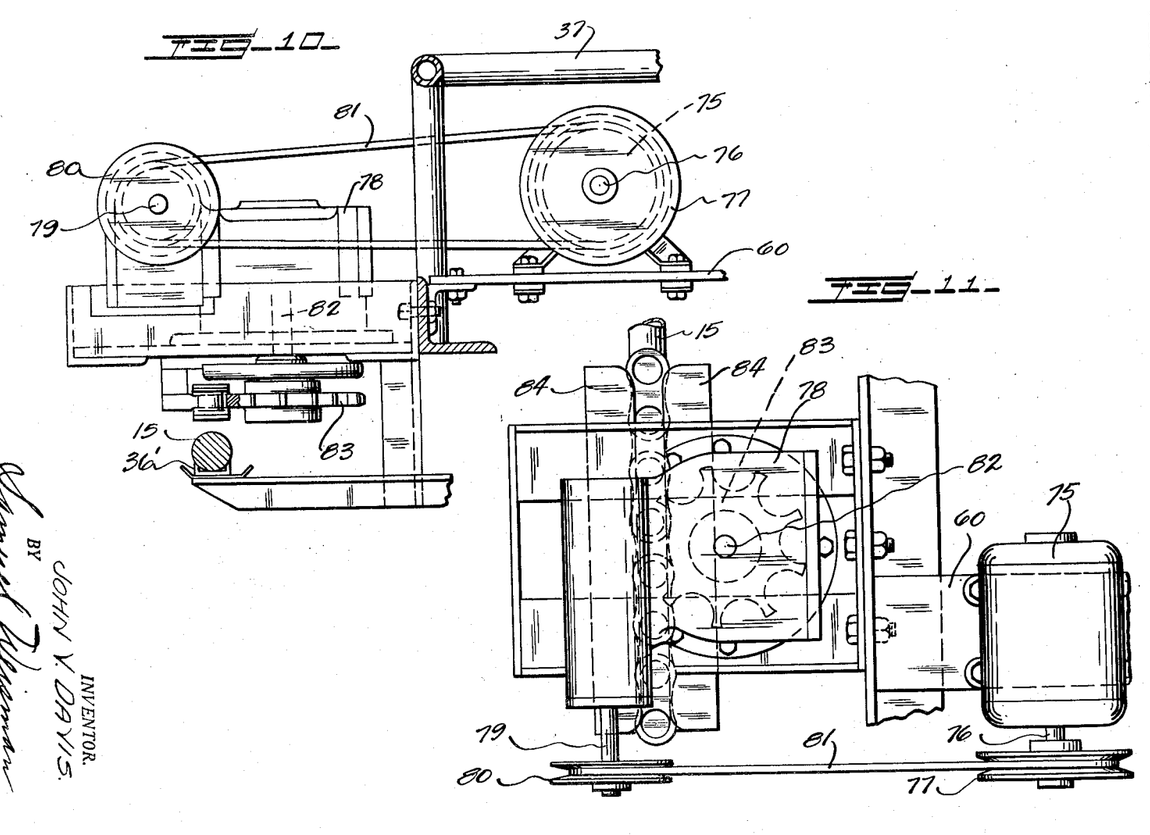
Figure 10 is a vertical elevation of the chain driving mechanism, showing associated parts in section.
Figure 11 is a plan view thereof.

The chassis members 35 carry outwardly extending arms 51 at close intervals. The outer end of each arm has a chain guide shoe 52 bolted thereto, with a spacer block 53 interposed. Hangers 35' are suspended from the members 35, and to the hangers are secured outwardly extending arms 35''. The arms 35'' carry jaws 36' in which are clamped rail sections 54, in the same manner as the sections 15, directly over the gaps 22 in order to fill the same. Those arms 35'' that are disposed at the columns 10 also carry rollers 50', as shown in Figure 2. The ends of the sections 54 are pointed at 55 and the walls of the V-slots are preferably coated with graphite to serve as a lubricant and as a conductor between the fixed and movable rail sections. Additional jaws 36' can easily be applied to other members 36 in order to provide flexibility for inserting additional movable rail sections wherever desired and of whatever length. The gaps 22 will, of course, be made to correspond with the length of the respective movable sections.

The chassis 35—37 also carries end plates 60 for supporting guide wheels 61 in a horizontal plane and having substantially the same radius as the bends 62 in the intermediate rail. Around the wheels 61 is trained a double link sprocket chain consisting of two sets of overlapping links 63 joined and spaced by hollow studs 64.

Work carrier hooks 65 are slidably suspended from the intermediate rail by shoes 66 formed integrally with the hooks. Racks 67 are suspended from the hooks, and the work is mounted on the racks in the usual manner. The carrier hooks are propelled by pushers carried by the work drive chain 63, 64. Each pusher consists of a shoe 68 slidable on the intermediate rail, with an integral top plate 69 extending therefrom and having two fixed vertical pins 70 passed through two consecutive hollow studs 64 of the chain. The pins 70 are held by a cross pin 71 passed through their free ends.

On one of the end plates 60 is mounted an electric motor 75 on a horizontal axis lengthwise of the machine. The extended motor shaft 76 carries a drive pulley 77. On the chassis 35—37 is also mounted a gear reduction box 78 having an input shaft 79 parallel to the motor shaft 76.

The shaft 79 carries a pulley 80 in line with the pulley 77, and the pulleys are joined by a belt 81. The output shaft 82 of the gear reduction box extends vertically downward and carries a drive sprocket 83 meshing with the chain 63, 64. Guide shoes 84 engage the chain at both sides of its point of engagement with the sprocket 83.

In the operation of the device as thus far described, let it be assumed that the racks are to be mounted on 18" centers. In such case the pushers 68—71 are mounted on 18" centers on the chain 63, 64. The work is loaded on a fixed rail section 15 at the loading station and becomes automatically spaced when engaged by the pushers.

The motor 75 is timed to move the chain intermittently. When the rail sections 15 and 54 are in line, the chain 63, 64 is moved a predetermined distance which may be the center distance or about 18". It stops for a predetermined interval, during which the hydraulic cylinder 40 is actuated to lift the movable sections 54, thereby clearing the work over the partitions 7. The chain is then shifted less than the lower movement, or about 17". The elevated work is thus transferred over the partitions 7. When the chain stops, the hydraulic cylinder 40 is operated again to lower the chain and the rail sections 54. The chain is now shifted about 18", and the cycle is repeated. The timing of the motor and hydraulic cylinder may be accomplished by means known in the art, such as limit switches 90 operated by fingers 91 on the chain and limit switches 92 operated by fingers 93 on the elevator structure.

Figure 1:
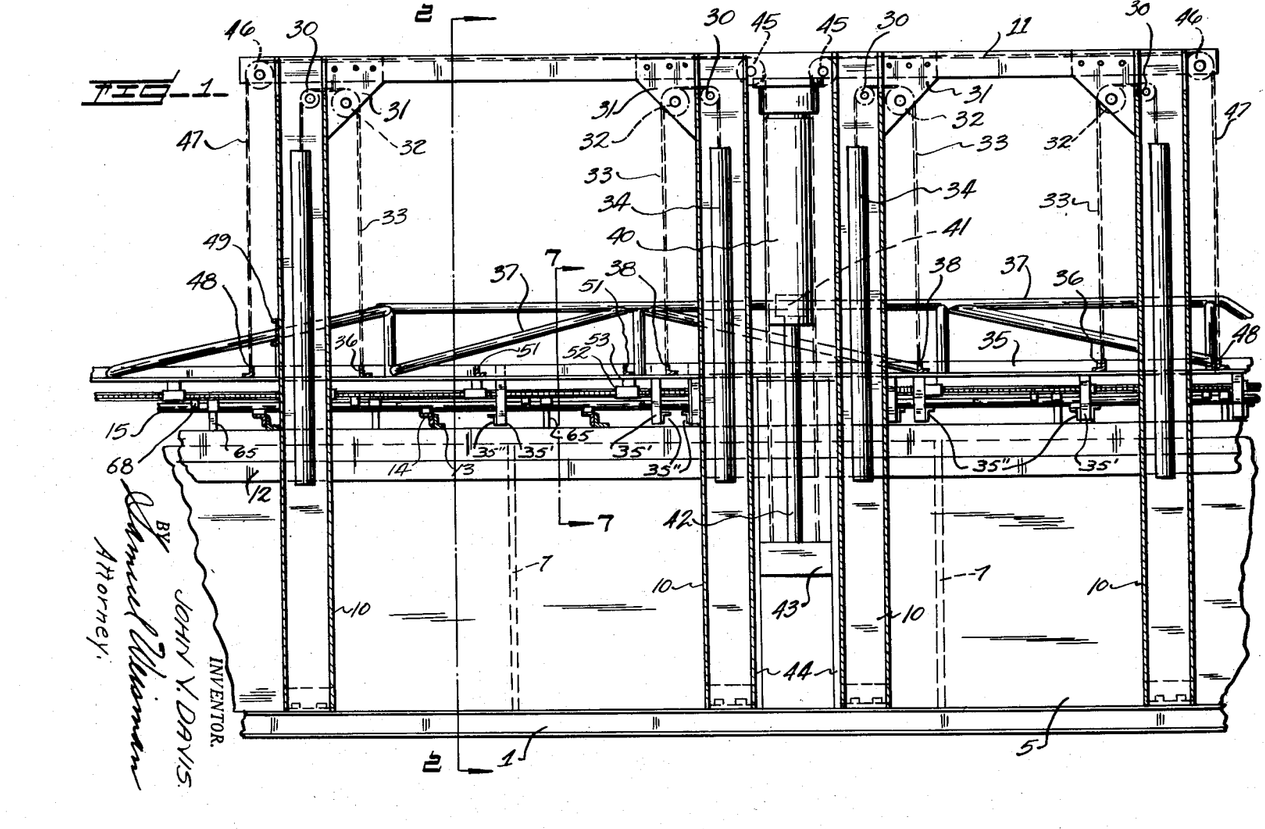
Figure 1 is a fragmentary side elevation of the device, partly in section.

As a result of the shorter chain movement in the elevated position than in the lower position, the pushers 68—71 come downwardly to rest on the fixed rail sections 15 at positions spaced behind the hooks 65 on these sections, as shown in Figure 1 thus avoiding clashing and assuring that the work will be pushed in the next movement of the chain.

Figure 12:
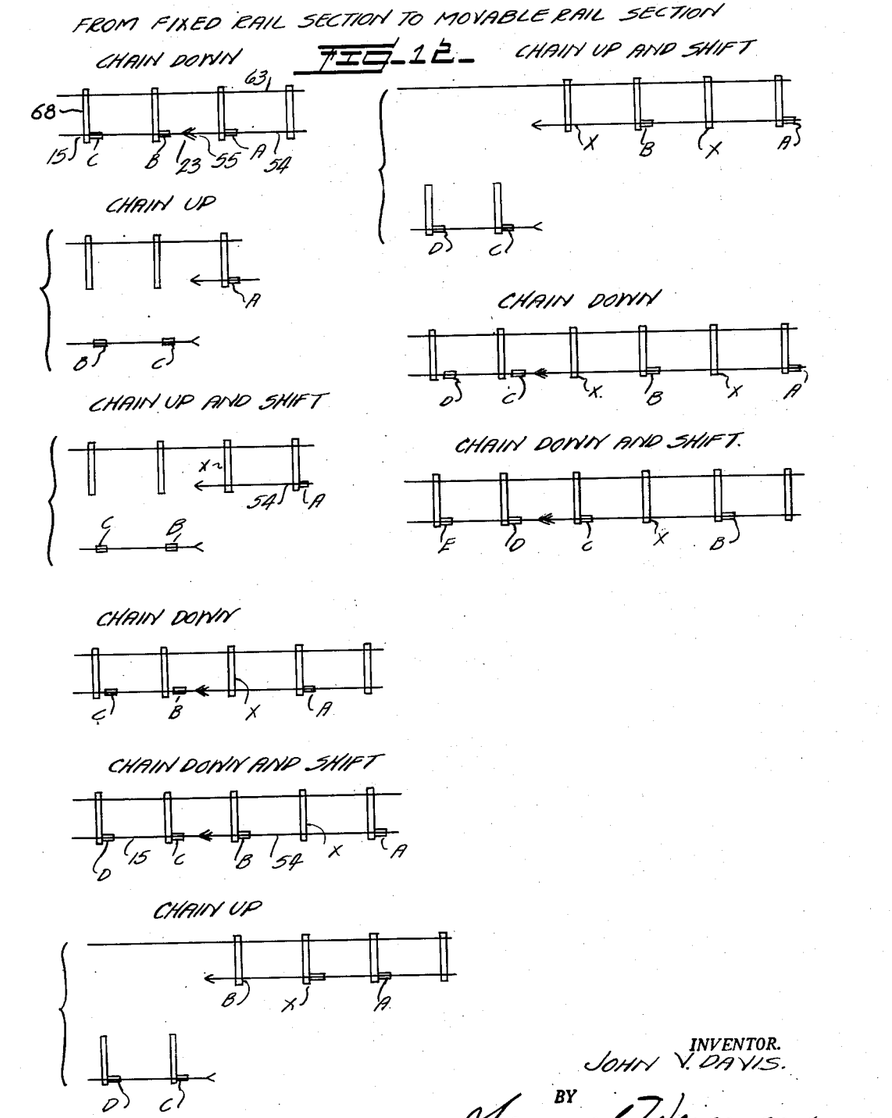
Figure 12 is a diagram illustrating the movement of work from a fixed rail section to a movable rail section.
Figure 13:
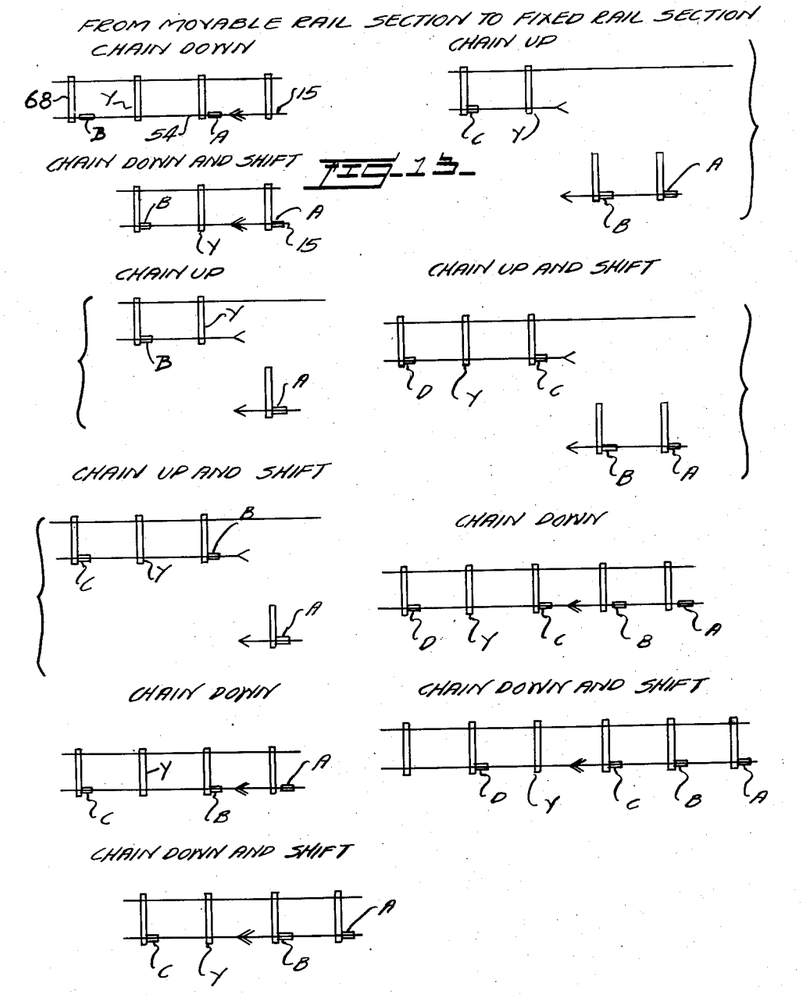
Figure 13 is a diagram illustrating the movement of work from a movable rail section to a fixed rail section.

The movement of the work with respect to the fixed and movable rail sections is illustrated diagrammatically in Figures 12 and 13. The rail joints 23, 55 are arranged to lie about midway between consecutive pushers at rest. The work is assumed to be spaced 18" apart on a fixed section, and work piece A is first moved about 9" on the movable section 54. When the latter is raised with the pusher chain, pieces B and C become disengaged from the pushers. The next chain movement advances piece A on section 54 and also an unloaded pusher X, while pieces B and C remain stationary. When the rail sections are again alined and the pusher chain shifted again, piece B is advanced on section 54, with idle pusher X in front of it, while pieces C and D are advanced on fixed section 15 at the normal 18" centers. Thus, consecutive pieces A and B on a movable section 54 are spaced double the normal distance. The remaining diagrams in Figure 12 show that all pieces on a given movable section 54 are necessarily spaced in the same way because of the transfer of an unloaded pusher X from a fixed section to a movable section in the elevated position of the latter.

As the work passes from a movable section 54 to a fixed section 15, it resumes the normal 18" spacing. This is illustrated in Figure 13. The foremost piece A on section 54 is first pushed about 9" on the fixed section 15. When the pusher chain and section 54 are raised and the chain shifted, piece A remains stationary while pieces B and C are advanced on section 54. Unloaded pushers Y have made an idle movement on section 54. The rail sections are again alined and the pusher chain again shifted, advancing piece A a full stroke and piece B a half stroke on section 15, while piece C advances a full stroke on section 54. The alternate unloaded pushers Y on movable section 54 assure that work pieces will not be pushed off that section in its elevated position. Pieces A and B are one stroke apart on section 15, and the remaining diagrams in this figure show that succeeding pieces are similarly spaced on the fixed rail section 15. This is due to the transfer of unloaded pushers Y on section 15, or the stationary condition of work pieces on section 15 while other pieces are being advanced thereto from movable section 45. Thus, when the work reaches the unloading station on a fixed rail section, it is on normal 18" centers.

One of the advantages of the apparatus is the simplicity of the lifting mechanism, involving only the elevating of the single drive chain and the movable rail sections. The usual transfer devices, requiring removal of the work from the carrier rail, are eliminated. The work does not leave the rail. Consequently, a simplified integral carrier hook becomes feasible.

A separate transfer mechanism for each transfer station is not required. There is one transfer mechanism common to all stations, i. e. the elevator chassis carrying the transfer rail sections and the pusher chain.

Additional transfer stations may be provided by cutting sections from the fixed rail at such stations and mounting them on the chassis in the same manner as the other movable rail sections.

The upper horizontal chain speed may be different from the lower horizontal speed, thus furnishing an additional variable or controllable factor in the overall timing. Another result of this characteristic is the assured positioning of the pushers behind the carrier hooks on the fixed rail sections when the pusher chain is brought down, as already set forth.

The work is lifted and lowered in a true vertical path, with the result that waste of tank length is avoided. Moreover, the construction of the elevator mechanism is such as to permit unequal lifting and lowering speeds. Some shapes of work require slow lifting but permit rapid immersion, while other shapes require slow immersion but permit rapid lifting.

The work carrier center distance may be varied without requiring alteration of the transfer mechanism. It is only necessary to relocate the pushers on the drive chain and readjust the timing.

In the modification shown in Figures 14 to 18, there is provided, as in the previous embodiment, a tank 90, columns 91 and a vertically movable chassis 92. The chassis carries movable rail sections 93 and a work drive chain 94 substantially in the manner previously described. One of the wheels around which the chain 94 is passed is a sprocket 95 meshing with the chain to rotate positively therewith for a purpose that will presently appear. The tank 90 supports fixed rail sections 96 also as previously described.

Figures 14, 15, 16, 17, 18:
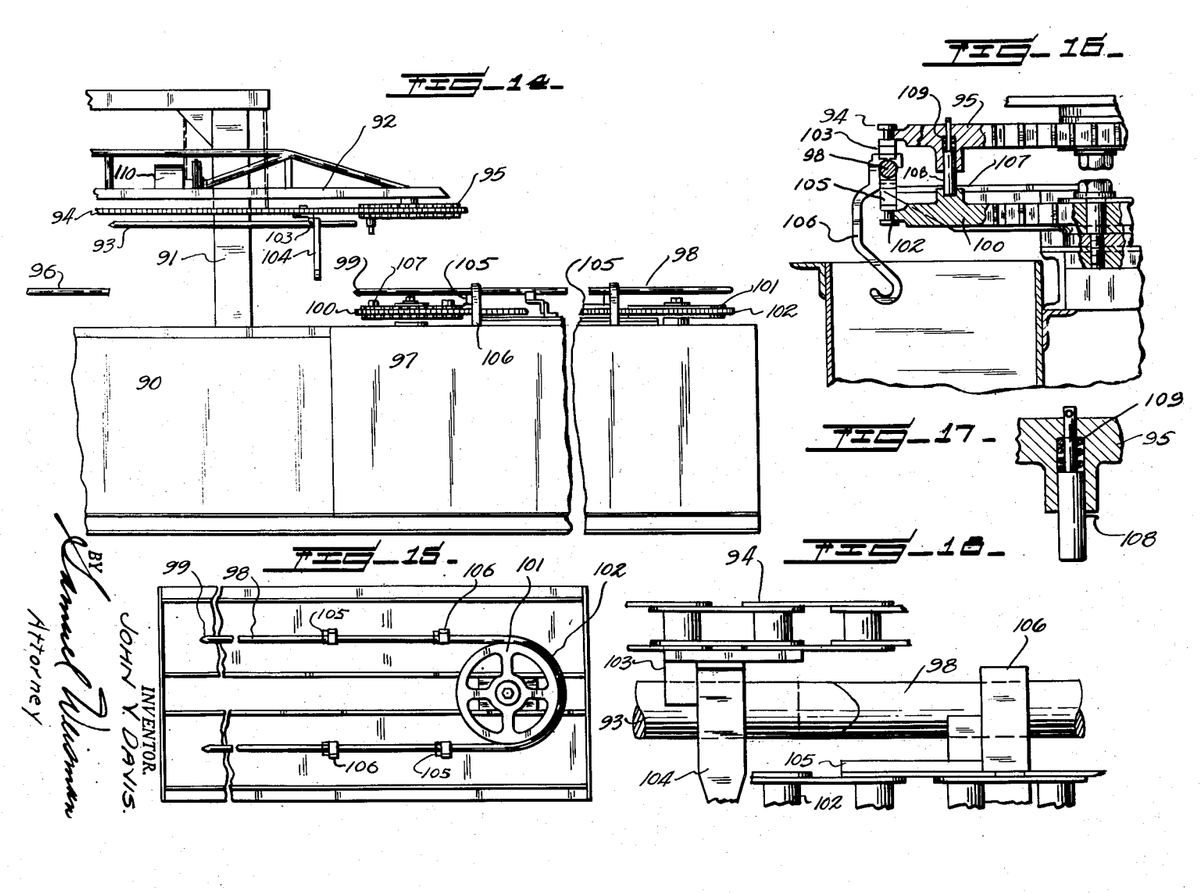
Figure 14 is a partial side elevation on a modified machine having a segmented rail and a continuous rail.
Figure 15 is a plan view of the continuous rail portion thereof.
Figure 16 is a vertical section of the interconnecting drive gear.
Figure 17 is a detail of Figure 16.
Figure 18 is a detail elevation illustrating the segmented rail and the continuous rail in communication with each other.

A second tank 97 is mounted in line with the tank 90 and is of such length as to furnish a relatively long immersion. On this tank is suitably supported a continuous or non-segmented rail 98 having however, free ends 99 positioned to register with movable rail sections 93 when lowered. The tank 97 supports a pair of wheels 100 and 101 around which is trained a work moving chain 102. The wheel 100 is a sprocket and is vertically coaxial with the wheel 95. The chain 94 carries pushers 103 adapted to engage hangers 104 on the sections 93, and the chain 100 similarly carries pushers 105 engaging hangers 106 on the continuous rail 98.

The upper face of the sprocket 100 is formed with a series of pockets 107 spaced circumferentially according to the pitch of the chains. From the lower face of the upper wheel 95 extends a drive pin 108 backed by a spring 109 and adapted to enter one of the pockets 107 when the chassis 92 is lowered. The chain 94 is driven by mechanism 110 as in the previous construction. It is now apparent that when the chassis is lowered the pin 108 cooperates with the sprocket 107 to serve as a clutch for driving the wheel 100 and the chain 102, intermittently advancing the work from one end of the rail 98 to the other.

The rail sections are suitably insulated from the other parts of the apparatus. Each section is obviously equipped with an individual pair of conduction cables that permit the movement of the movable sections. Suitable switching mechanism is provided for placing a positive or a negative charge, selectively, on the rail sections in any of their positions, i. e., the upper and lower positions and while in motion upward or downward.

Although specific embodiments of the invention have been illustrated and described, it will be understood that various alterations in the details of construction may be made without departing from the scope of the invention as indicated by the appended claims.

What I claim is:

1. In an apparatus for treating work by immersion, a series of receptacles, a work carrier rail extending along said receptacles, said rail having a fixed section and a movable section, an elevator frame over said receptacles and rail, pusher means carried by said frame for moving work along said rail, said movable rail section being also carried by said frame, said pusher means being in permanent functioning relation to said movable section, and means for raising and lowering said frame.

2. In an apparatus for treating work by immersion, a series of receptacles, a work carrier rail extending along said receptacles, said rail having a fixed section and a movable section, an elevator frame over said receptacles and rail, a work drive chain carried by said frame, pusher elements carried by said chain for moving work along said rail, said movable rail section being also carried by said frame, said pusher elements being in permanent functioning relation to said movable section, and means for raising and lowering said frame.

3. In an apparatus for treating work by immersion, a tank, a partition dividing said tank into compartments, a work carrier rail extending along said tank, said rail having a fixed section and a movable section, the movable section passing through the upwardly projected plane of said partition, pusher means for moving work along said rail, and means for elevating said movable section and said pusher means from said fixed section, with said pusher means in functioning relation to said movable section.

4. In an apparatus for treating work by immersion, a tank, a partition dividing said tank into compartments, a work carrier rail extending along said tank, said rail having a fixed section and a movable section, the movable section passing through the upwardly projected plane of said partition, an elevator frame over said tank and rail, pusher means carried by said frame for moving work along said rail, said movable rail section being also carried by said frame, said pusher means being in permanent functioning relation to said movable section, and means for raising and lowering said frame.

5. In an apparatus for treating work by immersion, a tank, a partition dividing said tank into compartments, a work carrier rail extending along said tank, said rail having a fixed section and a movable section, the movable section passing through the upwardly projected plane of said partition, an elevator frame over said tank and rail, a work drive chain carried by said frame, pusher elements carried by said chain for moving work along said rail, said movable rail section being also carried by said frame, said pusher elements being in permanent functioning relation to said movable section, and means for raising and lowering said frame.

6. In an apparatus for treating work by immersion, a tank, a partition dividing said tank into compartments, a work carrier rail extending along said tank, said rail having a fixed section and a movable section, the movable section passing through the upwardly projected plane of said partition, an elevator frame over said tank and rail, pusher means carried by said frame for moving work along said rail, said movable rail section being also carried by said frame, said pusher means being in permanent functioning relation to said movable section, means carried by said frame for propelling said pusher means, and means for raising and lowering said frame.

7. In an apparatus for treating work by immersion, a tank, a partition dividing said tank into compartments, a work carrier rail extending along said tank, said rail having a fixed section and a movable section, the movable section passing through the upwardly projected plane of said partition, an elevator frame over said tank and rail, a work drive chain carried by said frame, pusher elements carried by said chain for moving work along said rail, said movable rail section being also carried by said frame, said pusher elements being in permanent functioning relation to said movable section, means carried by said frame for propelling said pusher means, and means for raising and lowering said frame.

8. A processing apparatus comprising a tank, a work carrier rail extending along said tank, said rail having a fixed section and a movable section, an elevator frame over said tank and rail, pusher means carried by said frame for moving work along said rail, said movable rail section being also carried by said frame, said pusher means being in permanent functioning relation to said movable section, means for raising and lowering said frame, a second tank alined with the first tank, a carrier rail extending along the second tank, a pusher cooperating with the last named rail, and means operatively connected with said pusher means to drive said pusher in the lowered position of said frame and to disengage from said pusher in the elevated position of said frame.

9. A processing apparatus comprising a tank, a work carrier rail extending along said tank, said rail having a fixed section and a movable section, an elevator frame over the said tank and rail, a work drive chain carried by said frame, pusher elements carried by said chain for moving work along said rail, said movable rail section being also carried by said frame, said pusher elements being in permanent functioning relation to said movable section, and means for raising and lowering said frame, a second tank alined with the first tank, a carrier rail extending along the second tank, a pusher cooperating with the last named rail, a wheel rotatable during movement of said chain, and means associated with said wheel for clutching with and driving said pusher in the lowered position of said frame and declutching from said pusher in the elevated position of said frame.

10. A processing apparatus comprising a tank, a work carrier rail extending along said tank, said rail having a fixed section and a movable section, an elevator frame over the said tank and rail, a work drive chain carried by said frame, pusher elements carried by said chain for moving work along said rail, said movable rail section being also carried by said frame, said pusher elements being in permanent functioning relation to said movable section, and means for raising and lowering said frame, a second tank alined with the first tank, a carrier rail extending along the second tank, a pusher chain for the last named rail, a wheel for driving said pusher chain, a wheel rotatable during movement of the first named chain, and clutching means between said wheels and adapted to engage in the lowered position of said frame and to disengage on elevation of said frame.

11. In an apparatus for treating work by immersion, a series of receptacles, a horizontal work carrier rail extending along said receptacles, said rail having a fixed section and a vertically movable section, a pusher propelling means vertically movable with said vertically movable rail section, said pusher propelling means having pusher elements operative on said fixed and movable sections and movable longitudinally of said fixed and movable sections for pushing work therealong, and means for simultaneously elevating said movable section and said pusher propelling means and pusher elements from said fixed section.

12. In an apparatus for treating work by immersion, a series of receptacles, a horizontal work carrier rail extending along said receptacles, said rail having a fixed section and a vertically movable section, a pusher propelling means vertically movable with said vertically movable rail section, said pusher propelling means having pusher elements operative on said fixed and movable sections and movable longitudinally of said fixed and movable sections for pushing work therealong, and means for simultaneously elevating said movable section and said pusher propelling means and pusher elements from said fixed section, the joint end of one of said rail sections being formed with a recess, and the joint end of the other section being shaped to enter said recess on vertical movement.

13. In an apparatus for treating work by immersion, a series of receptacles, a horizontal work carrier rail extending along said receptacles, said rail having a fixed section and a vertically movable section, a pusher propelling means vertically movable with said vertically movable rail section, said pusher propelling means having pusher elements operative on said fixed and movable sections and movable longitudinally of said fixed and movable sections for pushing work therealong, and means for simultaneously elevating said movable section and said pusher propelling means and pusher elements from said fixed section, the joint end of one of said rail sections having a V-groove with its sides in vertical planes, and the joint end of the other section being tapered to enter said groove on vertical movement.

JOHN V. DAVIS.

REFERENCES CITED

The following references are of record in the file of this patent:

UNITED STATES PATENTS

| Number | Name | Date |
|---|---|---|
| 545,412 | McCarter | Aug. 27, 1895 |
| 607,656 | Dixon | July 18, 1898 |
| 1,860,105 | Lemire | May 24, 1932 |
| 2,023,668 | Dow | Dec. 10, 1935 |
| 2,116,430 | Gordon | May 3, 1938 |
| 2,182,184 | Todd | Dec. 5, 1939 |
| 2,245,673 | Huenerfauth | June 17, 1941 |
| 2,342,598 | Ozouf | Feb. 22, 1944 |

FOREIGN PATENTS

| Number | Country | Date |
|---|---|---|
| 627,401 | France | June 7, 1927 |